Sept. 26, 1967  A. J. TYRRELL  3,343,676
MAGNETIC FILTER

Filed April 1, 1965  4 Sheets-Sheet 1

INVENTOR.
ARTHUR J. TYRRELL
BY
AGENT

INVENTOR.
ARTHUR J. TYRRELL

INVENTOR.
ARTHUR J. TYRRELL

Sept. 26, 1967      A. J. TYRRELL      3,343,676
MAGNETIC FILTER

Filed April 1, 1965      4 Sheets-Sheet 4

INVENTOR.
ARTHUR J. TYRRELL
BY
AGENT

United States Patent Office 3,343,676
Patented Sept. 26, 1967

3,343,676
MAGNETIC FILTER
Arthur James Tyrrell, Ashtead, Surrey, England, assignor to North American Philips Company, Inc., New York, N.Y., a corporation of Delaware
Filed Apr. 1, 1965, Ser. No. 444,544
Claims priority, application Great Britain, Apr. 23, 1964, 16,875/64
11 Claims. (Cl. 210—90)

This invention relates to a magnetic filter for extracting ferro-magnetic particles from a fluid.

In modern power stations, very pure water is used in a closed continuous system which includes the turbine and a pump for pumping the water around the system. Because of the expense of the pumps and the turbines, it is very desirable that any particles which find their way into the water system should be removed as quickly as possible since the presence of such particles tends to increase wear of these and other mechanical parts of the system. Furthermore, a small pile-up of solid material in a water tube in the boiler, can give rise to local overheating and failure.

It is thought that most wear and damage is caused by minute ferro-magnetic particles which cannot easily be removed from the water by conventional non-magnetic filters. It is furthermore thought that these minute particles build up in various parts of the closed system until suddenly a whole mass of minute particles frees itself and is carried along the system with large momentum. It is therefore necessary for any filter to be mechanically strong since otherwise it is likely to be damaged by the moving mass of particles. Also, small amounts of solids are believed to cause local corrosion areas which may result in failure.

An object of the present invention is to provide a magnetic filter which may extract these small ferro-magnetic particles from the water and which, furthermore, may act as a filter for larger non-magnetic bodies in the water system.

According to the invention a magnetic filter comprises an inlet and an outlet, a first grating of magnetic material having a plurality of substantially parallel slots extending across its surface and located across the inlet, a second grating of magnetic material having a plurality of substantially parallel slots extending across its surface and located across the outlet substantially parallel to the first grating, a plurality of parallel meshes located between the first and second gratings, each mesh consisting of at least two non-magnetic strips extending in a direction at right-angles to the gratings which non-magnetic strips support a plurality of spaced parallel strips of magnetic material extending at right-angles to the non-magnetic strips, means for applying a magnetic field between the first and second gratings, together with a housing of non-magnetic material surrounding the meshes and secured to the gratings in a water-tight manner.

The fluid will enter the inlet and travel through the slots in the first grating. Any large particles will be prevented from proceeding by the first grating but minute particles will be carried with the water through the slots. During their movement through the meshes, they will encounter a number of magnetic fields extending between adjacent magnetic strips on each mesh and the ferro-magnetic particles will tend to become trapped within the gaps between these magnetic strips. The filtered fluid will then pass through the second grating and out of the outlet.

Each grating may be rectangular and strengthening members may be provided within the slots in such a manner as to maintain the slots parallel with one another. Alternatively each grating may be substantially circular, the slots being so arranged that the longest slots are located adjacent a diameter of the grating and the slots decreasing in length in a direction at right-angles to this diameter.

Preferably the strips of magnetic material of the meshes extend at right-angles to the slots in the gratings. The gratings may form pole-pieces of an electro-magnet or a permanent magnet.

If a permanent magnet is used to produce the magnetic field, then a stationary magnet may be secured across the edges of the gratings and a rotatable magnet may be secured across the opposite edges of the gratings; rotation of the rotatable magnet will vary the magnet field between the two gratings and if the magnets are of equal size and strength then the magnetic field may be switched off by connecting the north pole of the stationary magnet to the south pole of the rotatable magnet and the south pole of the stationary magnet to the north pole of the rotatable magnet through the two gratings.

To decrease corrosion of the filter, the magnetic parts may be of magnetic stainless steel or of rustless iron, and the non-magnetic parts may be of non-magnetic stainless steel.

In order that the invention may be readily carried into effect, two embodiments thereof will now be described, by way of example, with reference to the accompanying diagrammatic drawings, wherein.

Figure 1:
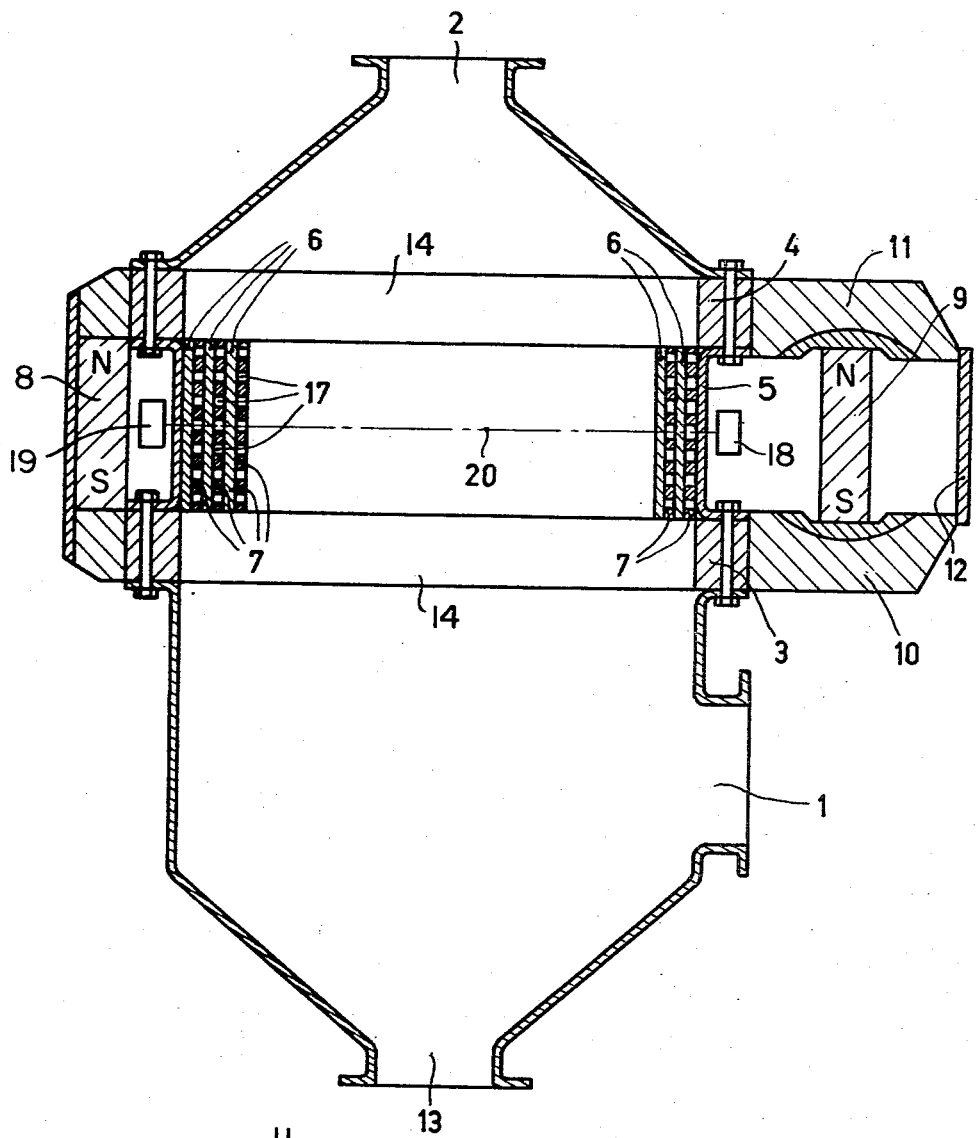
FIGURE 1 shows a sectional view of a magnetic filter.
Figure 8:
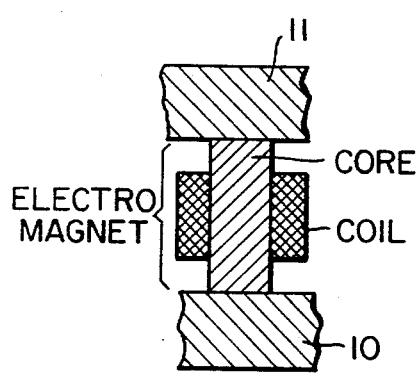
FIGURE 8 is an enlarged partial cross-sectional view of a detail of FIGURE 1 showing the rotatable permanent magnet replaced by a fixed soft iron core.

Referring now to FIGURE 1, a magnetic filter comprises an inlet 1 and an outlet 2. A first grating or grate-like element 3 of magnetic material is spaced from a second grating or grate-like element 4 of magnetic material by a housing 5 of non-magnetic material which is secured to the gratings 3 and 4 in a water-tight manner. The space bounded by the housing 5 and the gratings 3 and 4 is filled with a number of meshes or screens each consisting of at least one non-magnetic strip 6 extending between the gratings 3 and 4, the strips 6 supporting a plurality of spaced parallel strips 7 of magnetic material which extend parallel to the gratings 3 and 4.

A fixed permanent magnet 8 is secured across the gratings 3 and 4 while a rotatable permanent magnet 9 is rotatable within magnetic pole-pieces 10 and 11 secured to the gratings 3 and 4 respectively. Non-magnetic shielding members 12 are provided to protect the magnets from damage. A waste pipe 13 is provided adjacent the inlet 1.

Figure 2:
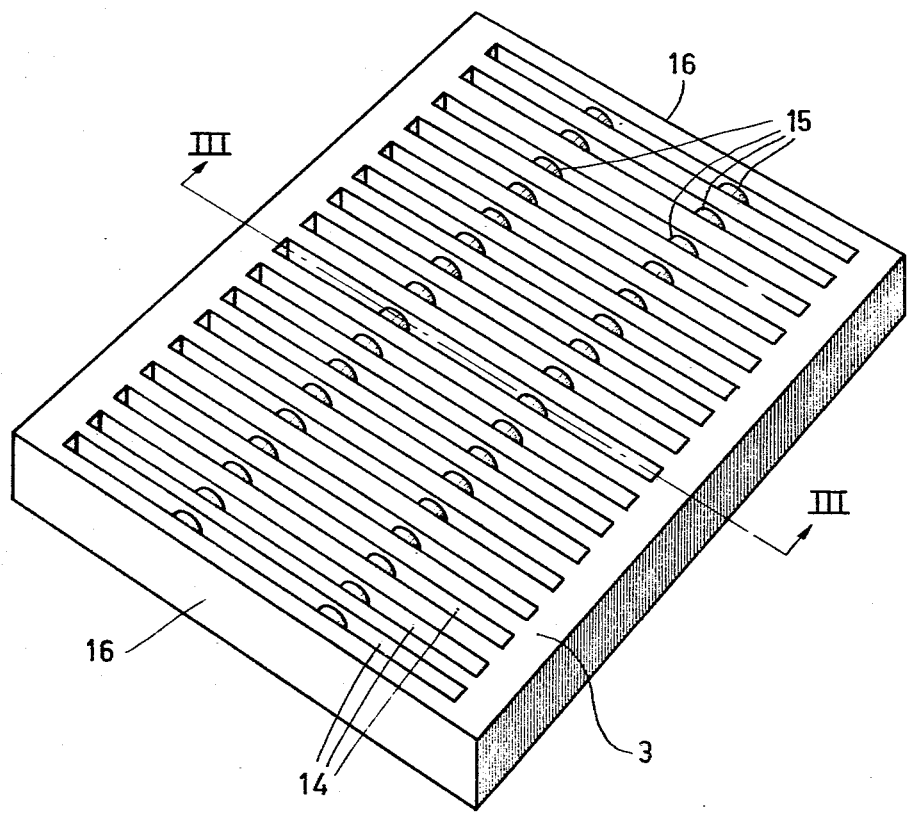
FIGURE 2 shows part of the filter shown in FIGURE 1.
Figure 3:
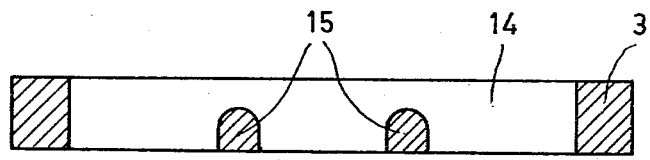
FIGURE 3 is a sectional view taken along the line III—III of FIGURE 2.

FIGURES 2 and 3 show a detail of the gratings 3 and 4. Each grating is substantially rectangular and is provided with a plurality of parallel slots 14 which extend across the surface of the grating. Strengthening pieces 15 are provided in the slots because of the high pressures likely to be met when the filter is being used. The pieces 15 prevent the sides 16 of the gratings from bowing out under pressure.

Figure 4:
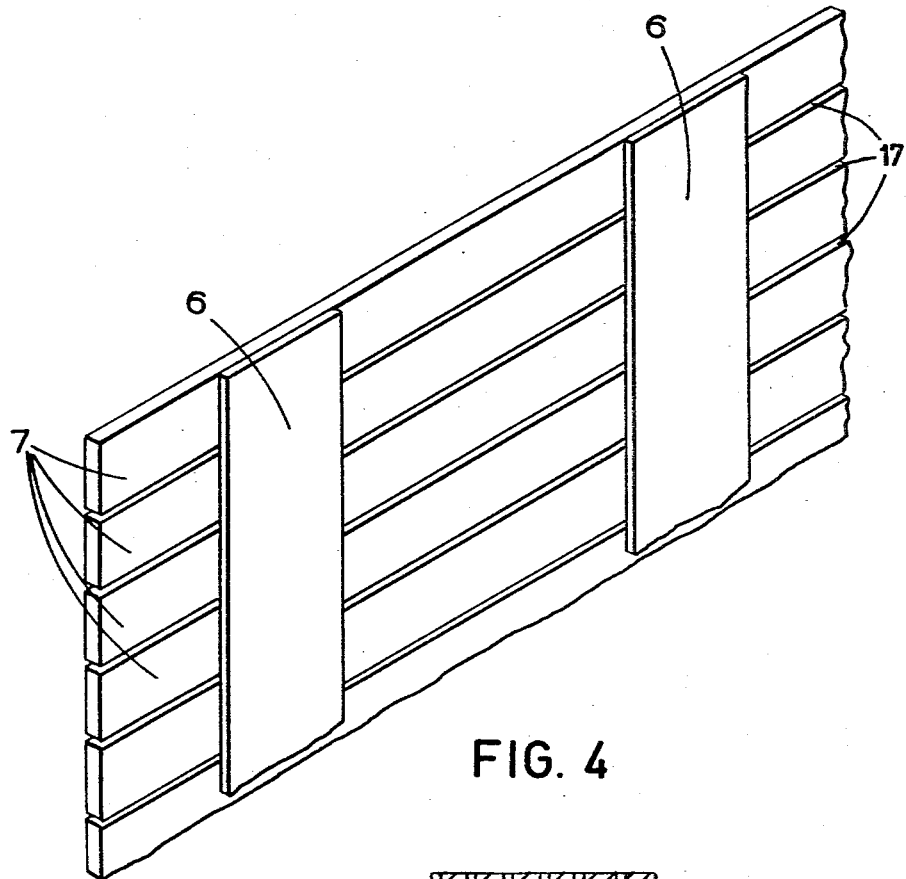
FIGURES 4 and 5 show perspective and sectional views respectively of a further part of the filter shown in FIGURE 1.

FIGURE 4 is a perspective view of an single mesh showing how the magnetic strips 7 are secured to the non-magnetic strips 6 so that a small gap 17 extends between the strips 7.

Figure 5:
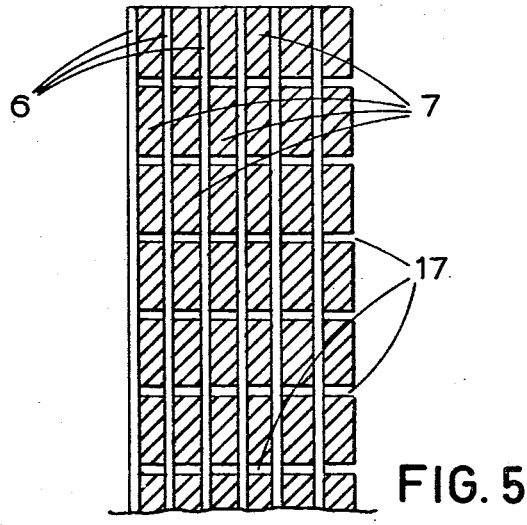

FIGURE 5 illustrates how the meshes are assembled within the filter. During operation of the filter fluid will flow through the meshes in a direction parallel to the longitudinal direction of the strips 6, magnetic fields being produced across the gaps 17. Ferromagnetic particles within the fluid will be attracted by these magnetic fields and will become trapped within the gaps 17. The operation of the device will now be described more fully with reference to FIGURE 1.

Fluid enters the filter through the inlet 1 and flows through the grating 3; the grating 3 will prevent large objects from passing further but small particles will be carried with the fluid into a space between the gratings 3 and 4. Ferro-magnetic particles within the fluid will be trapped in the gaps 17 between the magnetic strips 7 in the manner described above. The filtered fluid will pass through the grating 4 and leave the filter through the outlet 2. Eventually the gaps 17 will become filled with ferro-magnetic partcles and it will be necessary for the filter to be cleaned. A photo-electric cell may be provided at 18, which cell is lined up with a lamp 19 along a light path 20 extending through the gaps 17. When light ceases to reach the photo-cell 18 then obviously the gaps will be clogged and cleaning of the filter should be performed. Alternatively the pressure between the inlet 1 and the outlet 2 may be monitored and when this pressure reaches a predetermined value this will indicate that the filter is becoming clogged. The filter is cleaned as follows.

Initially, the inlet 1 is closed and then the magnetic field across the gratings 3 and 4 shut off. In the present example this is done by rotating the magnet 9 through approximately 180° so that its field opposes the field of the magnet 8 (for zero field the magnets should be of the same size and strength). The waste pipe 13 is then opened and closed fairly quickly so that the back pressure in the system flushes the fluid backwards through the meshes and through the waste pipe 13 carrying the particles with it. It may be desirable to close the outlet 2 and flush the filter with a separate water supply in which case the pipe 13 need not be opened and closed quickly. The magnetic field is again applied between the gratings 3 and 4 by rotating the magnet 9 through a further 180°. The inlet 1 may then be opened and then the outlet 2 if this was closed during the flushing operation.

This procedure may be started automatically when a signal is derived from a circuit associated with the lamp 19 and photo-cell 18. Cleaning of the filter can of course be done periodically.

It is desirable to provide more than one filter in each closed system since then one filter may be cleaned without having to close down the system. In, for instance, a power station where there is a flow rate of approximately 500,000 gallons per hour, four filter units may be used, each unit having gratings approximately 3 feet square and capable of handling a flow rate of approximately 2 feet per second. It can be arranged that three units handle normal flow and will do so during cleaning.

Figure 6:
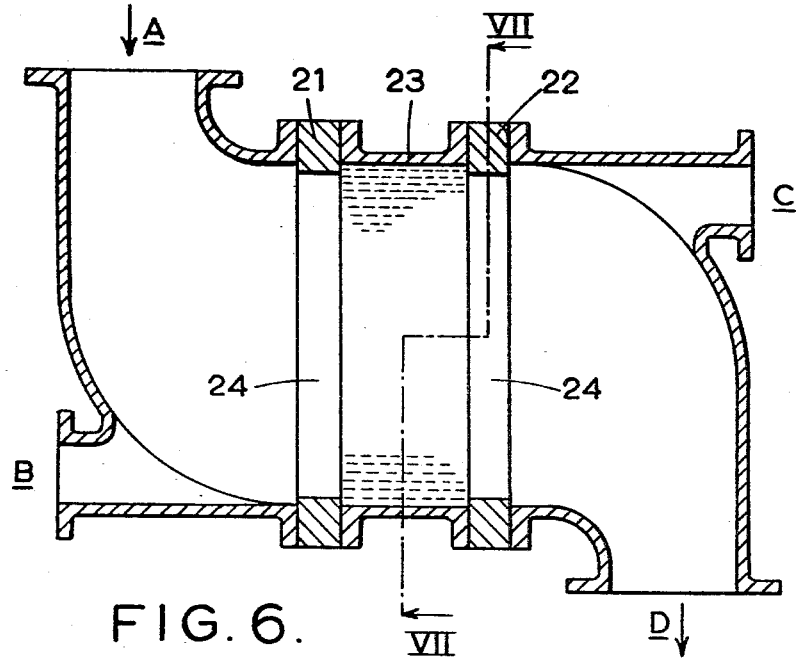
FIGURE 6 is a sectional view of a second embodiment.

FIGURE 6 is a sectional view of a second embodiment in which two gratings 21 and 22 are spaced apart by a housing 23 of non-magnetic material, each grating being of magnetic material and being provided with a plurality of parallel slots 24. The space bounded by the gratings 21 and 22 and the housing 23 is filled with a number of closely packed meshes similar in shape to those described with reference to FIGURES 4 and 5. The filter is further provided with an inlet port A, an outlet port D and two further ports B and C. It will be noted that the housing containing the ports A and B is similar to the housing containing the ports C and D, thereby reducing the manufacturing cost.

Figure 7:
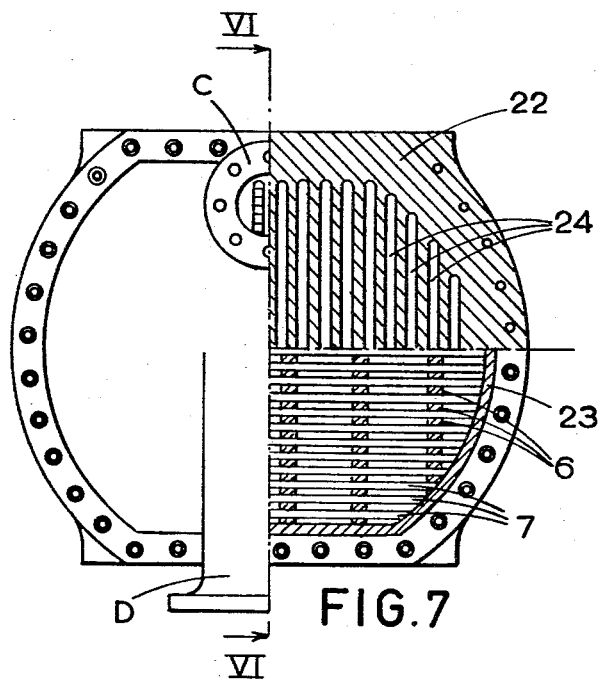
FIGURE 7 is a part sectional view along the line VII—VII of FIGURE 6.

The left-hand side of FIGURE 7 shows an external view of the filter shown in FIGURE 6 while the right-hand side of FIGURE 7 is a sectional view along the line VII—VII of FIGURE 6. It will be seen that the grating is substantially circular, the longest slots 24 being located along a diameter and the slots decreasing in length in a direction at right-angles to this diameter. The section also shows how the meshes are assembled within the filter.

The use of the filter shown in FIGURES 6 and 7 is somewhat different to that shown in FIGURE 1 and will now be described. The ports B and C are normally closed and fluid enters the filter through the inlet port A and leaves the filter through the outlet port D. To clean the filter the outlet port D is closed and then the inlet port A is closed. The field across the gratings 21 and 22 is shut off and the inlet ports C and B are then opened. Water enters through the port C, flushes the filter and leaves through the port B where it is collected in a settling tank. Ports B and C are then closed, the magnetic field is switched on, inlet port A opened, and then outlet port D opened. The cleaning may be performed periodically or it may be performed when the filter shows signs of clogging, for example by means of a pressure measuring device between the inlet and outlet ports or a photo-cell and lamp lines up along the gaps as shown in FIGURE 1. The magnetic field may be produced by a permanent magnet system similar to that described with reference to FIGURE 1 or alternatively by means of an electromagnet.

What is claimed is:

1. A magnetic filter comprising a housing provided with an inlet and an outlet, a first grate-like element of magnetic material having a plurality of parallel-disposed slots therein and positioned across said inlet, a second grate-like element of magnetic material having a plurality of parallel-disposed slots therein and positioned across said outlet and substantially parallel to the first grate-like element, a plurality of screens located between said first and second grate-like elements and extending in a direction substantially perpendicular to said grate-like elements, each of said screens comprising at least two non-magnetic, spaced supporting strips and a plurality of spaced, parallel magnetic strips mounted on said supporting strips and perpendicular thereto, the spaces between said supporting strips being aligned with the openings in at least some of the grate-like elements, and means for applying a magnetic field between said first and second grate-like elements, said housing being non-magnetic and surrounding said grate-like elements and screens in a water-tight enclosure.

2. A magnetic filter as claimed in claim 1 wherein each grate-like element is rectangular in configuration and further comprising reinforcing members connecting adjacent magnetic strips in said screens and maintaining the spaces between said strips parallel to one another.

3. A magnetic filter as claimed in claim 1 wherein each grate-like element is substantially circular, and wherein the slots in said elements are arranged whereby the longest slots are located adjacent to a diameter of said element and decrease in length in a direction perpendicular to said diameter.

4. A magnetic filter as claimed in claim 1 wherein said magnetic strips extend substantially at right angles to the slots of said grate-like elements.

5. A magnetic filter as claimed in claim 1 wherein said grate-like elements form pole pieces for an electromagnet.

6. A magnetic filter as claimed in claim 1 wherein said grate-like elements form pole pieces for a permanent magnet.

7. A magnetic filter as claimed in claim 6 further comprising a stationary magnet mounted across one of the edges of one of said grate-like elements, said permanent magnet being rotatable across the opposite edge of the other of said grate-like element whereby rotation of the rotatable magnet is arranged in order to vary the magnetic field between said two grate-like elements.

8. A magnetic filter as claimed in claim 1 further comprising means responsive to the presence of ferro-magnetic particles trapped in the meshes of said screen to indicate when said screen has become clogged.

9. A magnetic filter as claimed in claim 8 wherein said means for indicating clogging of the screen comprises a light source and a photo-electric cell responsive to light passing from said source through the meshes of said screen.

10. A magnetic filter as claimed in claim 9 further comprising means operable by a signal derived from a circuit associated with said photo-electric cell which automatically commences a flushing operation when the screen becomes clogged.

11. A magnetic filter as claimed in claim 8 wherein said means for indicating clogging of the screen comprises additional means for monitoring the pressure difference between the inlet and outlet of said filter.

References Cited

UNITED STATES PATENTS

| 2,317,774 | 4/1943 | Kiek et al. | 210—222 |
| 2,822,089 | 2/1958 | Woodruff | 210—222 X |
| 3,136,720 | 6/1964 | Baermann | 210—222 |
| 3,186,549 | 6/1965 | Botstiber | 210—222 X |

FOREIGN PATENTS

| 801,003 | 9/1958 | Great Britain. |
| 222,330 | 7/1942 | Switzerland. |

REUBEN FRIEDMAN, *Primary Examiner.*

J. ADEE, *Assistant Examiner.*